United States Patent
Lee et al.

(10) Patent No.: US 9,290,637 B2
(45) Date of Patent: *Mar. 22, 2016

(54) PIGMENTED WAX DISPERSION AND METHOD FOR PREPARING SAME

(71) Applicant: Xerox Corporation, Norwalk, CT (US)

(72) Inventors: Frank Ping-Hay Lee, Oakville (CA); Aurelian Valeriu Magdalinis, Aurora (CA); Michael J. D'Amato, Thornhill (CA); Richard P. N. Veregin, Mississauga (CA); David John William Lawton, Stoney Creek (CA); Marcel P. Breton, Mississauga (CA)

(73) Assignee: Xerox Corporation, Norwalk, CT (US)

(*) Notice: Subject to any disclaimer, the term of this patent is extended or adjusted under 35 U.S.C. 154(b) by 90 days.

This patent is subject to a terminal disclaimer.

(21) Appl. No.: 14/256,937

(22) Filed: Apr. 19, 2014

(65) Prior Publication Data

US 2015/0299425 A1    Oct. 22, 2015

(51) Int. Cl.
*C09D 11/34* (2014.01)
*C08K 5/3417* (2006.01)

(52) U.S. Cl.
CPC .............. *C08K 5/3417* (2013.01); *C09D 11/34* (2013.01)

(58) Field of Classification Search
CPC ....................................................... C09D 11/34
See application file for complete search history.

(56) References Cited

U.S. PATENT DOCUMENTS

| | | |
|---|---|---|
| 5,184,783 A | 2/1993 | Hockmeyer et al. |
| 5,497,948 A | 3/1996 | Hockmeyer |
| 5,820,040 A | 10/1998 | Hockmeyer et al. |
| 7,175,118 B2 | 2/2007 | Hockmeyer |
| 7,559,493 B1 | 7/2009 | Hockmeyer et al. |
| 7,828,234 B1 | 11/2010 | Hockmeyer et al. |
| 7,883,036 B1 | 2/2011 | Cullens et al. |
| 7,914,200 B1 | 3/2011 | Hockmeyer et al. |
| 7,973,186 B1 | 7/2011 | Goredema et al. |
| 8,182,133 B1 | 5/2012 | Hockmeyer et al. |
| 8,376,252 B1 | 2/2013 | Hockmeyer et al. |
| 2014/0356778 A1 | 12/2014 | Wolfe et al. |
| 2015/0013567 A1 | 1/2015 | Lopez et al. |

OTHER PUBLICATIONS

Frank Ping-Hay Lee, et al., U.S. Appl. No. 14/256,938, filed Apr. 19, 2014, "Aqueous Ink Jet Printing Ink," not yet published.
Frank Ping-Hay Lee, et al., U.S. Appl. No. 14/256,939, filed Apr. 19, 2014, "Process for Preparing an Aqueous Ink Jet Printing Ink," not yet published.
Frank Ping-Hay Lee, et al., U.S. Appl. No. 14/256,941, filed Apr. 19, 2014, "Toner Comprising Colorant Wax Dispersion," not yet published.

*Primary Examiner* — Veronica F Faison
(74) *Attorney, Agent, or Firm* — Marylou J. Lavoie, Esq. LLC

(57) ABSTRACT

A process for preparing a pigmented wax dispersion including (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; wherein the melting and mixing of step (a) and the milling of step (b) is done in an immersion media mill; and wherein the combining of step (c) is done using a piston homogenizer.

20 Claims, 3 Drawing Sheets

PIGMENTED WAX DISPERSION AND METHOD FOR PREPARING SAME

RELATED APPLICATIONS

Commonly assigned U.S. patent application Ser. No. 14/256,938, entitled "Aqueous Ink Jet Printing Ink", filed concurrently herewith, is hereby incorporated by reference herein in its entirety.

Commonly assigned U.S. patent application Ser. No. 14/256,939, entitled "A Process For Preparing An Aqueous Ink Jet Printing Ink", filed concurrently herewith, is hereby incorporated by reference herein in its entirety.

Commonly assigned U.S. patent application Ser. No. 14/256,941, entitled "Toner Comprising Colorant Wax Dispersion", filed concurrently herewith, is hereby incorporated by reference herein in its entirety.

TECHNICAL FIELD

Described herein are wax dispersions. More particularly, described herein are pigmented wax dispersions and methods of making such pigmented wax dispersions.

BACKGROUND

Pigment dispersions for pigmented phase change ink (sometimes referred to as hot melt ink or solid ink) require milling of pigments to a particle size preferably as small as the primary particle size of the pigment which can be 100 nanometers in diameter or less. Pigment size reduction can be costly and energy intensive. Known technologies that are suitable for dispersing pigments in wax media at temperatures higher than 100° C. include attrition, extrusion and homogenization. These processes require excessive milling times (up to 7 days milling time) and in some cases known processes are not even capable of delivering the required pigment particle size. Furthermore, in processes that utilize milling media (stainless steel, silica, zirconia, etc.) media wear can result in ink contamination.

Pigment dispersion is an important step in the manufacturing of pigmented phase change ink. Pigments are often supplied by the manufacturer as dry aggregates and agglomerates many times larger than the primary particle size (usually on the order of less than about 100 nanometers in diameter). These aggregates or agglomerates have to be reduced in size to less than about 100 nanometers in diameter with a narrow particle size distribution to form a stable dispersion in the solid ink medium. This is needed for the resulting solid ink formulation to demonstrate good jetting and print quality performance.

Processes for particle dispersion and pigment size reduction, such as milling and homogenization, are known. These known processes operate at room temperature, or at elevated temperatures, but still significantly below 100° C.

Wax dispersions used for manufacturing emulsion aggregation toners can be prepared by emulsifying a molten polyethylene or polymethylene wax in de-ionized water and surfactant using a piston homogenizer operating at 6,000 psig pressure and at a temperature of 120° C. to 130° C. The resulting emulsion typically contains about 30 weight percent solids and the following particle size specifications:

D50 Spec: 209±45 via W143 Nanotrac® (243±nanometers via Omnova Brookhaven)

D95 Spec: 650 nanometer maximum

U.S. patent application Ser. No. 13/940,731, which is hereby incorporated by reference herein in its entirety, describes in the Abstrate thereof a process for preparing a pigment dispersion including melting a phase change ink carrier and an optional dispersant at a temperature of from about 100° C. to about 170° C. in a jacketed vessel comprising a jacket surrounding an immersion mill or basket mill attachment and a dispersion blade attachment disposed within the jacketed vessel; mixing the melted phase change ink carrier and optional dispersant with a dispersion blade in the jacketed vessel; adding a pigment to the melted, mixed phase change ink carrier and optional dispersant in the jacketed vessel; wetting the pigment; after pigment wetting, reducing the pigment particle size using an immersion mill or basket mill attachment in the jacketed vessel; and discharging the pigment dispersion.

The appropriate components and process aspects of the each of the foregoing U. S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process for preparing a pigmented wax dispersion comprising (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; wherein the melting and mixing of step (a) and the milling of step (b) is done in an immersion media mill; and wherein the combining of step (c) is done using a piston homogenizer.

Also described is an aqueous submicron pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; wherein the pigmented wax dispersion is prepared by: (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form the pigmented wax dispersion; wherein the melting and mixing of step (a) and the milling of step (b) is done in an immersion media mill; and wherein the combining of step (c) is done using a piston homogenizer.

DETAILED DESCRIPTION

Figure 1:
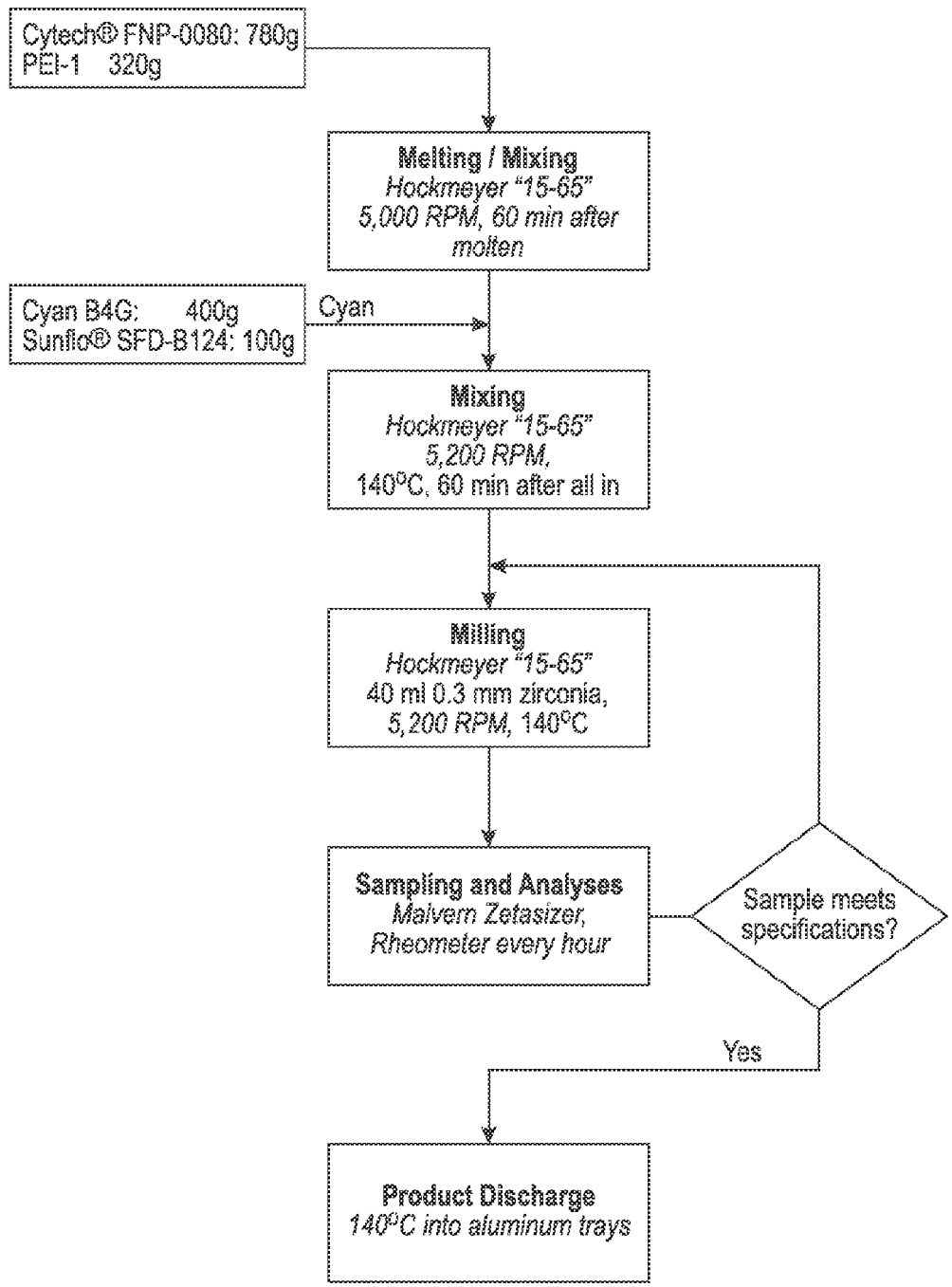
FIG. 1 is a flow diagram illustrating a process for preparing pigment concentrate in accordance with the present disclosure.

A method and apparatus is described for preparing a pigmented wax dispersion suitable for use as a core component for manufacturing toners or inks. The pigment encapsulated aqueous wax dispersions prepared herein can be used for various applications including aqueous latex-based ink or toner applications. An example of toner which can be prepared from the present pigmented wax dispersion is a super spreading toner, which can form ultrathin" layers of from about 1 to about 2 micrometers in thickness. The dispersions can also be used for preparing aqueous thermal, piezo or acoustic ink jet inks.

In embodiments, highly pigmented toners and inks containing 25 percent by weight or higher pigment incorporation can be achieved with the present pigmented wax dispersions while simultaneously providing a low viscosity dispersion. Thus, in embodiments, a system and method herein comprises fabricating a pigment concentrate and wax dispersion and a super spreading toner containing the pigment concentrate and wax dispersion. In certain embodiments, the pigment concentrate contains a cyan pigment. In specific embodiments, the pigment concentrate contains 25 weight percent of a Clariant® Cyan B4G pigment with an average particle size of about 80 nanometers within the wax matrix. In embodiments, a wax dispersion herein has an average particle size of about 200 nanometers prepared using the pigment concentrate. The resulting pigmented wax dispersion comprises, in embodiments, a 200 nanometer wax dispersion wherein the pigment having an average particle size of about 80 nanometers is contained within the wax particles. The wax dispersion can be identified by TEM imaging which shows wax particles having pigments particles dispersed therein.

The present embodiments enable small-size pigment which allow increased optical density in resulting printed images. As noted hereinabove, the pigmented wax can be used in many applications including next generation toners and inks and super spreading toners. Use of the present pigmented wax dispersion in super spreading toner applications provides the advantage of significantly reduced run cost for printers. The present pigmented wax dispersion can be incorporated into a wide variety of emulsion aggregation toners and can be used in a variety of other applications as well. Further, the present pigmented wax dispersions enable production of high quality and low cost toners. The ability to create aqueous pigment-in-wax dispersions, wherein the pigment is mostly of primary particle size, can be used in many applications including direct marking and xerographic applications.

The present process for preparing a pigmented wax dispersion comprises (a) melting and mixing a dry pigment with at least one wax to form a pigment concentrate, wherein the pigment concentrate contains at least 25 percent by weight of pigment; (b) milling the pigment concentrate of step (a) to form a milled pigment concentrate; (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers; wherein the melting and mixing of step (a) and the milling of step (b) is done in an immersion media mill; and wherein the combining of step (c) is done using a piston homogenizer. The pigmented wax particles have an average particle size of from about 80 to about 300 nanometers, or from about 100 to about 250 nanometers, or from about 170 to about 230 nanometers. In certain embodiments, wherein the pigmented wax particles exhibit a particle size distribution of from about 150 to less than about 230 nanometers or from about 150 to less than about 200 nanometers. In embodiments, the pigmented wax particles have a Z average particle size of about 200 nanometers. Average particle size can be measured in any suitable or desired way, such as with a Nanotrac™ 252 (Microtrac, Montgomeryville, Pa., USA) particle size analyzer.

The pigment dispersion process can be carried out in any suitable or desired apparatus. In embodiments, the pigmented wax dispersion processes take place in the setting of a jacketed vessel surrounding a mill, in embodiments a jacketed vessel surrounding a basket mill or an immersion media mill. Generally, the mill comprises a vessel with a heating jacket, a disperser blade for mixing the phase change carrier and optional dispersant and later mixing the phase change carrier and optional dispersant and pigment to wet the pigment, or an immersion mill head (basket assembly) containing the grinding media, in embodiments, ceramic grinding media, for dispersing the pigment.

In one embodiment, all of the melting, mixing, wetting and dispersion takes place in the same vessel and the mixing blade is replaced by the immersion mill or basket mill. In another embodiment, the melting, mixing and wetting takes place in a different vessel and the wetted mixture is then transferred to the immersion mill.

In embodiments, the melting and mixing of step (a) and the milling of step (b) is done in an immersion media mill.

In embodiments, the combining of step (c) is done using a piston homogenizer.

Advantages achieved by the present process including using an immersion media mill, in embodiments a Hockmeyer Immersion Media Mill, for wet pigment grinding include that the immersion media mill requires only one tank for pigment dispersion (wetting) and milling operations. Thus, a simplified process is provided. Previously, wet pigment grinding was done using a horizontal media mill which requires a feed tank, feed pump, and connecting piping for recirculating materials between the feed tank and the milling chamber. Further, the present process using an immersion media mill for steps (a) and (b) benefit in that the immersion media mill uses an overhead drive for supporting the milling basket and turning the impeller. This process can be operated at atmospheric pressure and does not require a mechanical seal for the drive shaft. A horizontal media mill operates under pressure of up to 100 psi and requires a mechanical seal for the drive shaft. A further advantage of the present process is that in an immersion media mill, milling takes place inside the immersion basket. Small milling baskets require small amounts of grinding media and less power to achieve higher impeller velocity.

Melting and mixing the dry pigment with at least one wax can be done using a high shear disperser blade or impeller attachment inside a jacketed vessel. The impeller rotational speed (rpm), tip speed (feet per second) and temperature can be any suitable or desired speed or temperature, in embodiments, at temperatures higher than 100° C., higher than 120° C., 100 to about 170° C., 110 to 170° C., or 110 to 160° C., an rpm of from about 500 to about 5,500 rpm, or 500 to about 5,000 rpm, or 3,000 to about 5,200 rpm, and a tip speed of 4 to 40 feet per second or 23 feet per second to 40 feet per second.

Melting and mixing the dry pigment with at least one wax can be done at any suitable or desired temperature. In embodiments, the melting and mixing of step (a) is done at a temperature of from about 90 to about 170° C., or from about 100 to about 145° C., or from about 120 to about 140° C.

Melting and mixing the dry pigment with at least one wax can be done at any suitable or desired amount of time. In embodiments, the melting and mixing of step (a) is done for a period of from about 0.1 to about 10 hours, or from about 4 to about 10 hours, or from about 5 to about 8 hours, or from about 6 to about 7 hours. In a specific embodiment, melting and mixing of step (a) is done for a period of from about 1 to about 4 hours.

Mixing in step (a) can be done by any suitable or desired process. In embodiments, mixing of step (a) is done using a dispersion blade set at from about 500 to about 5,500 revolutions per minute, from about 1,500 to about 4,000 revolutions per minute, or from about 2,000 to about 3,000 revolutions per minute.

The milling of step (b) can be done using any suitable or desired process. In embodiments, milling of step (b) comprises a grinding step. An immersion mill or basket mill can be employed for the milling step (b). The basket mill can contain screens having suitable openings, such as 0.1 millimeter openings, on the side and bottom and can be filled with grinding media, such as ceramic grinding media, in embodiments, 0.3 millimeter diameter spherical zirconia grinding media. The basket mill can use an auger to draw the melt mixed pigment and wax particles into the mill. The centrifugal force exerted by the rotor and grinding media push the slurry out through the side and bottom screen. Milling can proceed for any suitable or desired time, in embodiments, for hours, until a desirable particle size distribution is achieved.

Any suitable or desired mill can be selected for the processes herein. In embodiments, the mill can be as described in U.S. Pat. No. 7,559,493, which is hereby incorporated by reference herein in its entirety. In embodiments, the process herein can be carried out using a Hockmeyer HCPN Dispermill®, available from Hockmeyer Equipment Corporation, which is a micro mill. This is an immersion mill including a vertical basket mill that utilizes grinding media to reduce the particle size of materials, such as for example, pigments. In further embodiments, the mill can be a mill as described in U.S. Pat. Nos. 5,184,783; 5,497,948; 5,820,040; 7,175,118; 7,559,493; 7,828,234; 7,883,036; 7,914,200; 8,182,133; or 8,376,252; each of which is hereby incorporated by reference herein in their entireties.

Any suitable or desired media milling material, such as beads or shot, can be included in the immersion mill head (basket assembly). In embodiments, 40 milliliters of 0.3 millimeter diameter zirconia is disposed in the mill head for the milling step.

In embodiments, the milling step (b) is done at a temperature of from about 90 to about 170° C., or from about 100 to about 145° C., or from about 120 to about 140° C.

Milling step (b) can be done for any suitable or desired amount of time, in embodiments, milling step (b) is done for a period of from about 0.1 to about 8 hours, or from about 1 to about 8 hours, or from about 3 to about 6 hours, or from about 2 to about 4 hours. In a specific embodiment, melting and mixing of step (a) is done for a period of from about 0.1 to about 4 hours.

The milled pigment concentrate of step (b) can be used immediately or stored for later use. In embodiments, the milled pigment concentrate of step (b) is discharged into aluminum trays.

The combining step (c) can be carried out by any suitable or desired process. In embodiments, the combining step (c) comprises (1) pre-homogenizing followed by (2) homogenizing. For example, in embodiments, the combining step (c) comprises (1) pre-homogenizing for a period of from about 0.1 to about 1.5 hours at a temperature of from about 90 to about 170° C., at from about 100 to about 1,000 rpm and about 300 to about 1,000 psi; followed by (2) homogenizing for a period of from about 0.5 to about 5 hours at a temperature of from about 90 to about 170° C., at from about 100 to about 1,000 rpm and about 4,000 to about 8,000 psi.

The process can further comprise (d) cooling the pigmented wax dispersion to any suitable or desired temperature, (e) filtering the pigmented wax dispersion; and (f) discharging the pigmented wax dispersion.

Cooling step (d) can comprises cooling the pigmented wax dispersion to any suitable or desired temperature; in embodiments, cooling to a temperature of from about 20 to about 50° C.

Filtering step (e) can be carried out by any suitable or desired process. In embodiments, filtering the pigmented wax dispersion comprising filtering through a filter having a filter size of from about 100 to about 300 micrometers. In embodiments, the pigmented wax dispersion can be filtered through a 150 micron nylon filter at temperature of 20 to about 50° C.

The pigmented wax dispersion particles provide small sized wax pigment dispersions. The particle size of the pigmented wax particles can be measured using any number of suitable Dynamic Light Scattering apparatuses, such as a Malvern Zetasizer. For instance, the Z-average particle size over time can be monitored to gauge the stability of the pigment particles while it is held at elevated temperatures, such as about 120° C. In embodiments, the pigmented wax particles herein have a Z average particle size of from about 80 to about 300 nanometers, or from about 100 to about 250 nanometers, or from about 170 to about 230 nanometers.

The pigmented wax dispersions can be used in a variety of applications. For example, the pigmented wax dispersions can be used in the preparation of inks and toners.

The pigmented wax dispersions herein can contain any suitable or desired pigment colorant. In specific embodiments, the colorant is a pigment. In a specific embodiment, the colorant is a pigment selected from the group consisting of a magenta pigment, a cyan pigment, a yellow pigment, a black pigment, and mixtures and combinations thereof. The pigmented wax dispersions may be stabilized by synergists and dispersants.

Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF);

PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

The pigmented wax dispersions can contain any suitable or desired wax. The wax will be selected in accordance with the desired end product.

In embodiments, the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

An aqueous submicron pigmented wax dispersion is thus provided comprising a plurality of pigmented wax particles comprising a pigment core surrounded by a wax shell, wherein the pigmented wax particles exhibit a particle size distribution of from about 150 nanometers to less than about 300 nanometers.

In embodiments, the aqueous submicron pigmented wax dispersion contains at least 25 percent by weight of pigment based on the total weight of the pigment and wax in the pigmented wax dispersion.

The aqueous submicron pigmented wax dispersion is a low viscosity dispersion, having a viscosity that is near that of water. In embodiments, the aqueous submicron pigmented wax dispersion has a viscosity of from about 1.2 to about 12 centipoise at a temperature range of about 20° C. to about 40° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

A cyan pigment concentrate containing 25 weight percent cyan pigment was prepared with the components described in Table 1.

TABLE 1

| Component | Weight Percent | Quantity (grams) |
| --- | --- | --- |
| Clariant ® Cyan B4G Pigment | 25 | 400 |
| PEI-1* | 20 | 320 |
| Sunflo ® SFD-B124** | | |
| Cytech ® FNP-0080*** | 48.75 | 780 |
| Total | 100 | 1,600 |

*PEI-1 is a polyethyleneimine dispersant as prepared in Example 1 of U.S. Pat. No. 7,973,186, which is hereby incorporated by reference herein in its entirety.
**Sunflo ® SFD-B124 is a derivatized sulfonated copper phthalocyanine synergist, available from Sun Chemical.
***Cytech ® FNP-0080 is a paraffin wax available from Cytec ®.

The process steps for preparing the pigment concentrate are illustrated in FIG. 1. With reference to FIG. 1, 780 grams of Cytech® FNP-0080 and 320 grams of PEI-1 were added to a Hockmeyer "15-65" Hockmeyer HCPN Dispermill®, available from Hockmeyer Equipment Corporation, which is a micro mill, with melting and mixing at 5,000 rpm (revolutions per minute) at a temperature of 140° C. for 60 minutes after molten. Thereafter, 400 grams of Clariant® Cyan B4G Pigment and 100 grams of Sunflo® SFD-B 124 were pre-blended and then the pre-blend was added to the mill with mixing at 5,200 rpm at 140° C. for 60 minutes after all pigment and dispersant were added. The mill was then charged with 40 milliliters of 0.3 millimeter zirconia beads, and mixing was continued at 5,200 rpm at 145° C. The material was sampled and analyzed every hour with a Malvern Zetasizer particle size analyzer, and the rheological properties of the material were determined at 110° C. using a 50 millimeter cone and plate geometry on a RFS-III rheometer, obtained from Rheometrics Corporation, now TA Instruments, Inc. When a sample met the desired specifications, the product was discharged at 140° C. into aluminum trays.

Example 2

A pigmented wax dispersion was prepared with the components described in Table 2 and using the cyan pigment concentrate of Example 1.

TABLE 2

| Component | Weight Percent | Mass (grams) |
| --- | --- | --- |
| Cyan Pigment Concentrate of Example 1 | 23.1 | 694.4 |
| TAYCA POWER BN2060* (60% solids) | 3.09 | 92.6 |
| Deionized Water | 73.8 | 2,213 |
| TOTAL | 100 | 3,000 |

Figure 2:
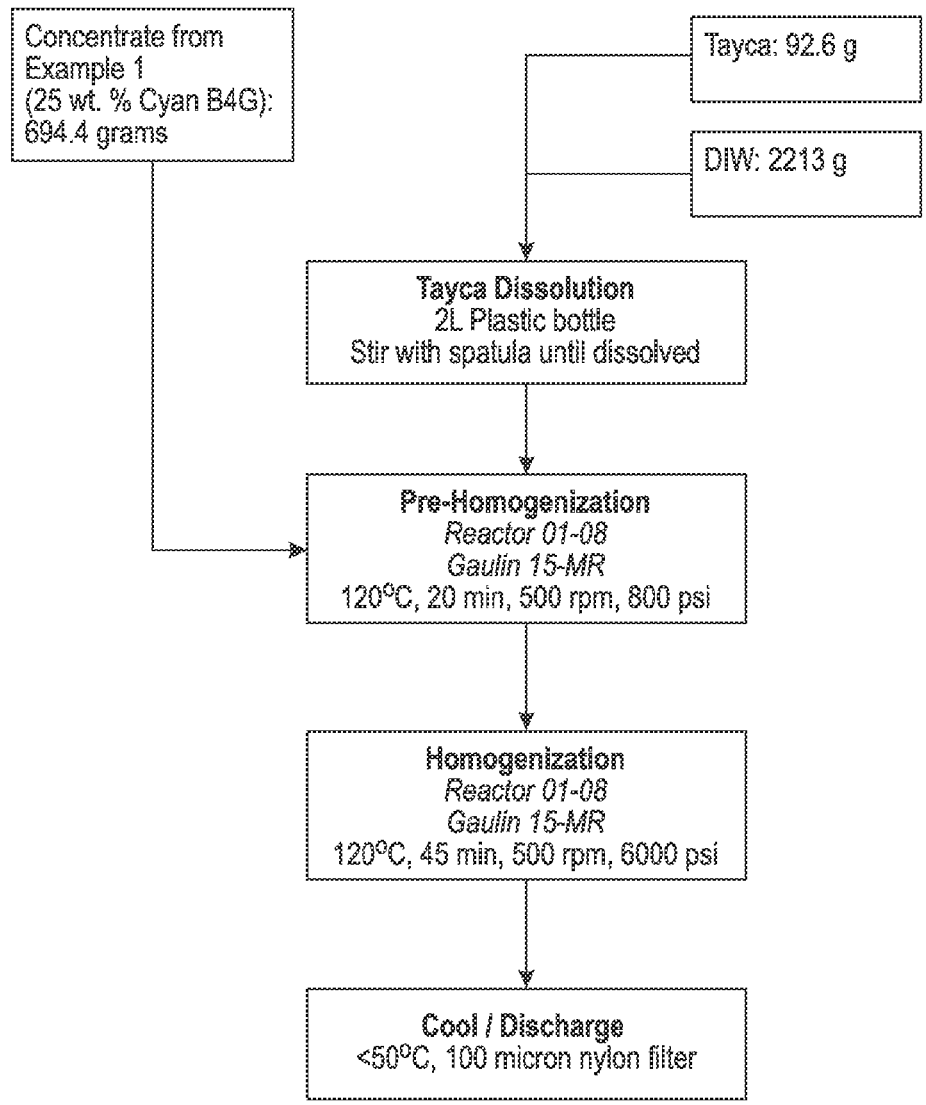
FIG. 2 is a flow diagram illustrating a process for preparing a pigmented wax dispersion in accordance with the present disclosure using the pigment concentrate as prepared in FIG. 1.

*TAYCA POWER BN2060 from Tayca Corporation (Japan), which are branched sodium dodecyl benzene sulfonates The process steps for preparing the pigmented wax dispersion are illustrated in FIG. 2. With reference to FIG. 2, 92.6 grams of TAYCA POWER BN2060 were dissolved in 2,213 grams of deionized water in a 1 Liter plastic bottle with stirring with a spatula until the TAYCA POWER was dissolved. Pre-homogenization was performed by adding 694.4 grams of the cyan pigment concentrate of Example 1 and the dissolved TAYCA POWER to a 01-08 Reactor, Gaulin 15-MR homogenizer and pre-homogenized at a temperature of 120° C. for 20 minutes at 500 rpm and 800 psi (pounds per square inch) to form a dispersion of pigmented wax in water.

The dispersion of pigmented wax in water was then homogenized in the 01-08 Reactor, Gaulin 15-MR homogenizer at a temperature of 120° C. for 45 minutes at 500 rpm and 6,000 psi. The pigmented wax dispersion was then cooled to a temperature of about 50° C., filtered through a 100 micron nylon filter, and discharged.

Figure 3:
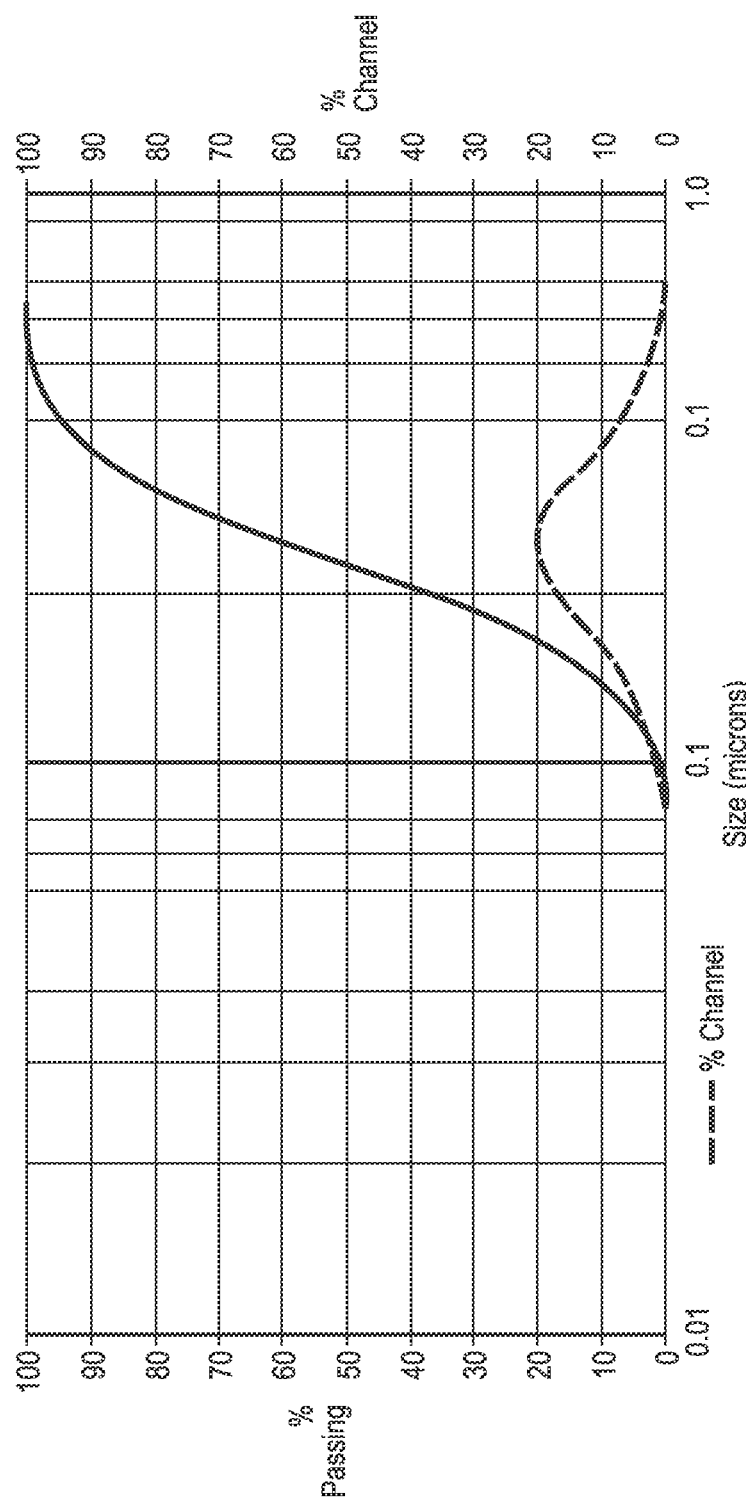
FIG. 3 is a graph showing particle size of a pigmented wax dispersion prepared in accordance with the present embodiments.

The particle size of the pigmented wax dispersion of Example 2 was measured with a Nanotrac™ 252 (Microtrac, Montgomeryville, Pa., USA) at room temperature. Results are shown in FIG. 3.

The pigmented wax dispersion of Example 2 exhibited a particle size distribution of from about 150 to about 300 nanometers with an average particle size about 222 nanometers.

Thus, provided herein is an improved system and method suitable for preparing wax dispersions, in embodiments aqueous submicron pigmented wax dispersions. Further provided is an improved system and method for preparing pigmented wax dispersions which dispersions are suitable for use in preparing toners. Further provided is a pigmented wax dispersion having a particle size that is similar to emulsion aggregation toner wax dispersion particle size.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process for preparing a pigmented wax dispersion comprising:
   (a) melting and mixing a dry pigment with at least one wax to form a pigment concentrate, wherein the pigment concentrate contains at least 25 percent by weight of pigment;
   (b) milling the pigment concentrate of step (a) to form a milled pigment concentrate;
   (c) combining the milled pigment concentrate of (b) with water and dispersing to form a pigmented wax dispersion comprising a plurality of pigmented wax particles comprising a pigment core surrounded by a wax shell, wherein the pigmented wax particles exhibit a particle size distribution of from about 150 nanometers to less than about 300 nanometers;
   wherein the melting and mixing of step (a) and the milling of step (b) is done in an immersion media mill; and
   wherein the combining of step (c) is done using a piston homogenizer.

2. The process of claim 1, wherein the melting and mixing of step (a) is done at a temperature of from about 90 to about 170° C.

3. The process of claim 1, wherein the melting and mixing of step (a) is done for a period of from about 1 to about 4 hours.

4. The process of claim 1, wherein the milling of step (b) is done at a temperature of from about 90 to about 170° C.

5. The process of claim 1, wherein the milling of step (b) is done for a period of from about 1 to about 8 hours.

6. The process of claim 1, wherein the combining of step (c) comprises (1) pre-homogenizing for a period of from about 0.1 to about 1.5 hours at a temperature of from about 90 to about 170° C., at from about 100 to about 1,000 rpm and about 300 to about 1,000 psi; followed by (2) homogenizing for a period of from about 0.5 to about 5 hours at a temperature of from about 90 to about 170° C., at from about 100 to about 1,000 rpm and about 4,000 to about 8,000 psi.

7. The process of claim 1, further comprising:
   (d) cooling the pigmented wax dispersion;
   (e) filtering the pigmented wax dispersion; and
   (f) discharging the pigmented wax dispersion.

8. The process of claim 7, wherein (d) cooling the pigmented wax dispersion comprises cooling to a temperature from about 20 to about 50° C.

9. The process of claim 7, wherein (e) filtering the pigmented wax dispersion comprises filtering through a filter having a filter size of from about 100 to about 300 micrometers.

10. The process of claim 1, wherein the pigmented wax particles have a Z average particle size of about 200 nanometers.

11. The process of claim 1, wherein the pigment is selected from the group consisting of a magenta pigment, a cyan pigment, a yellow pigment, a black pigment, and mixtures and combinations thereof.

12. The process of claim 1, wherein the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

13. An aqueous submicron pigmented wax dispersion comprising:
   a plurality of pigmented wax particles comprising a pigment core surrounded by a wax shell, wherein the pigmented wax particles exhibit a particle size distribution of from about 150 nanometers to less than about 300 nanometers;
   wherein the pigmented wax dispersion is prepared by:
   (a) melting and mixing a dry pigment with at least one wax to form a pigment concentrate, wherein the pigment concentrate contains at least 25 percent by weight of pigment;
   (b) milling the pigment concentrate of step (a) to form a milled pigment concentrate;
   (c) combining the milled pigment concentrate of (b) with water and dispersing to form the pigmented wax dispersion;
   wherein the melting and mixing of step (a) and the milling of step (b) is done in an immersion media mill; and
   wherein the combining of step (c) is done using a piston homogenizer.

14. The aqueous submicron pigmented wax dispersion of claim 13, containing at least 25 percent by weight of pigment based on the total weight of the pigment and wax in the pigmented wax dispersion.

15. The aqueous submicron pigmented wax dispersion of claim 13, having a viscosity of from about 1.2 to about 12 centipoise at a temperature range of about 20° C. to about 40° C.

16. The aqueous submicron pigmented wax dispersion of claim 13, wherein the pigmented wax particles have a Z average particle size of about 200 nanometers.

17. The aqueous submicron pigmented wax dispersion of claim 13, wherein the pigment is selected from the group consisting of a magenta pigment, a cyan pigment, a yellow pigment, a black pigment, and mixtures and combinations thereof.

18. The aqueous submicron pigmented wax dispersion of claim 13, wherein the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

19. The aqueous submicron pigmented wax dispersion of claim 13, wherein the combining of step (c) comprises (1) pre-homogenizing for a period of from about 0.1 to about 1.5 hours at a temperature of from about 90 to about 170° C., at from about 100 to about 1,000 rpm and about 300 to about 1,000 psi; followed by (2) homogenizing for a period of from about 0.5 to about 5 hours at a temperature of from about 90 to about 170° C., at from about 100 to about 1,000 rpm and about 4,000 to about 8,000 psi.

20. The aqueous submicron pigmented wax dispersion of claim 13, wherein the melting and mixing of step (a) is done at a temperature of from about 90 to about 170° C. for a period of from about 1 to about 4 hours; and wherein the milling of step (b) is done at a temperature of from about 90 to about 170° C. for a period of from about 1 to about 8 hours.

\* \* \* \* \*